2,953,933

Patented Sept. 27, 1960

2,953,933

SERVO-CONTROL MECHANISM

Manabu Kashiwara, 12 Karahashi-Hanazono-cho, Minamiku, Kyoto, Japan

Filed Apr. 1, 1959, Ser. No. 803,418

3 Claims. (Cl. 74—388)

This invention relates to improvements in servo-control mechanism.

Heretofore, various types of power-assisted control systems utilizing electric means, hydraulic pressure, and so on, have been used. But such apparatus is very expensive, especially in the case a considerable amount of power is required for control.

The main object of my invention is to provide a servo-control mechanism having a relatively simple construction, but which is nevertheless capable of deriving a considerable amount of power for control from a driving shaft following a signal furnished in the form of a displacement by a signal rod.

In the case of power control systems using hydraulic means or a electric means, disagreeable "hunting" often occurs.

Another object of my invention is to provide a servo-control mechanism which operates with substantially no "hunting" effect.

According to my invention there is provided a servo-control mechanism, comprising an infinitely variable speed changing means having a driving wheel for transmitting the power of a driving shaft constantly running in one direction and a follower wheel capable of being driven by the driving wheel in both directions at a speed ranging from zero to a certain value, a signal means for furnishing the follower wheel with an axial displacement from its neutral position to give rise to rotation thereof, and a compensating means for enabling the follower wheel to restore automatically to its neutral position through a differential gear mechanism.

My invention will be apparent from the following de-description taken with the accompanying drawings, in which.

Figure 1:
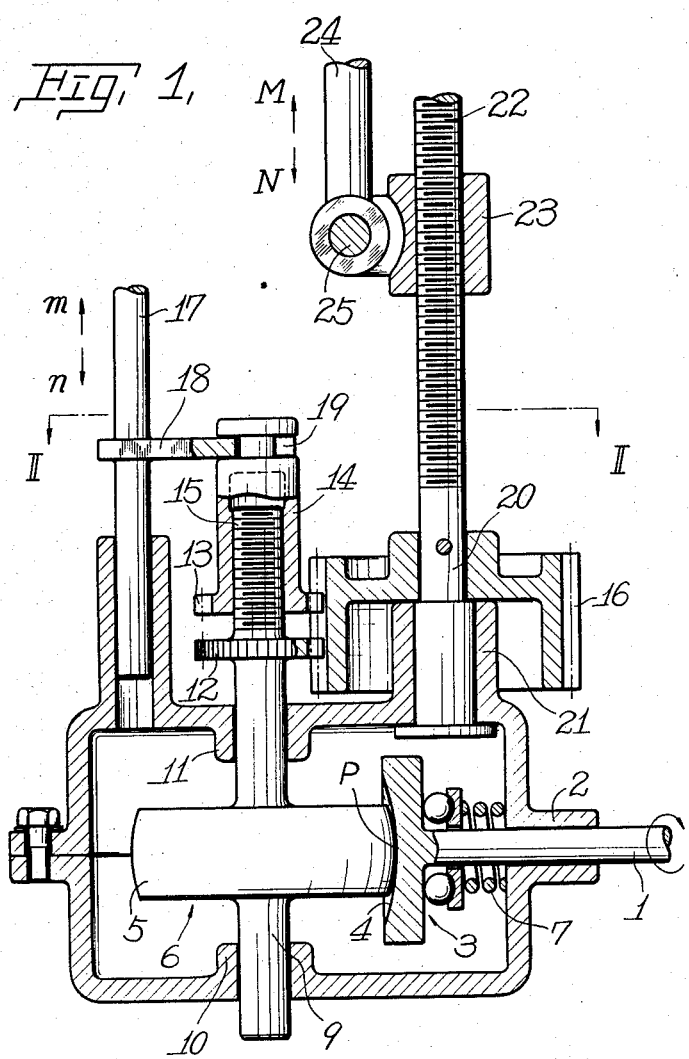
Figure 1 is a sectional view of the apparatus embodying the present invention.
Figure 2:
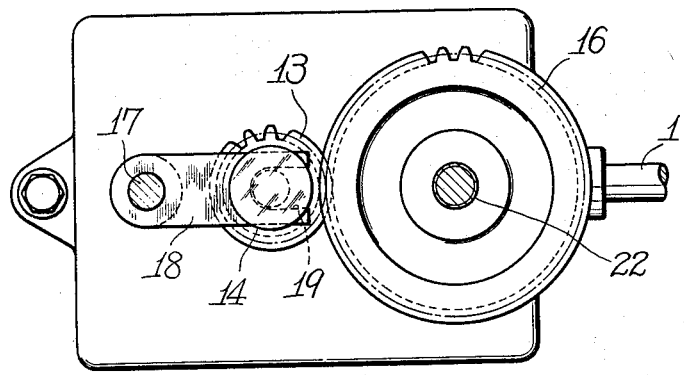
Figure 2 is a cross sectional view taken along the line II—II in Figure 1.

Referring to the drawings a shaft 1 is driven by a suitable driving source, for example by an electric motor. The driving shaft 1 is supported by a bearing 2, and is capable of moxing axially to a certain extent. On the shaft 1 is fixed a driving wheel 3 with concave surface 4 coaxially. The concave surface (4) of the driving wheel 2 is pressed against the peripheral convex surface 5 of a follower wheel 6 to form a frictional engagement by means of a coil spring 7.

The shaft 9 of the follower wheel 5 is supported by bearings 10, 11, and is capable of moving axially. A pinion 12 is fixed to the shaft 9 and coaxially with the pinion 12, there is arranged another pinion 13, which is integral with a cap nut 14. The cap nut 14 is fitted on a male screw 15 threaded on the upper portion of the shaft 9. The two pinions 12, 13 have the same diameter, but the number of teeth differs slightly for each pinion. Thus, in order to mesh with the same output gear 16, the two pinions 12, 13 may have profile shifted tooth form. If the driving shaft 1 rotates in a direction marked with an arrow, and if the male screw 15 provided on the shaft 9 is a right-handed one, then the number of teeth of the pinion 13 mounted on the shaft 9 fitting its female screw part with a male screw 15 on the shaft 9 is set at a value slightly less than that of the pinion 12. A signal rod 17 receiving a signal has an arm 18 with a forked end 19 which engages to the cap nut 14 to permit its axial displacement and rotation about the axis of the shaft 9.

A shaft 20, fixed to the gear 16 and rotatably supported by a bearing 21, is provided with a screw 22, and a nut 23 attached to a control rod 24 by a pin 25 is fitted thereon. The control rod 24 is movable along its axis and supported by a bearing not shown.

The driving shaft 1 is rotated constantly in one direction indicated by the arrow. When the follower wheel 6 is in a neutral position as shown in Figure 1, the peripheral convex surface 5 of the follower wheel 6 engages with the concave surface 4 of the driving wheel 3 at the center point P. This state is "neutral" and the rotation of the driving wheel 3 is not transmitted to the follower wheel 6. However, if the signal rod 17 is pulled by an amount $H_1$ in a direction marked with an arrow $m$ in Figure 1, the follower wheel 6 is also shifted by the amount $H_1$ to the position shown in Figure 3a. Thus, the contact point is shifted to the point $P_1$ by a distance depending on the distance $H_1$, and the follower wheel 6 is rotated at a peripheral velocity proportional to the effective radius $r$ of the driving wheel 3 at the contact point $P_1$, assuming no slip is present. When the engaging point moves as stated above, the distance L of the engaging point from the axis of the follower shaft 9 is changed but the variation of L is very small compared with the amount $H_1$. As the wheel rotates, the pinion 12 fixed on the shaft 9, the gear 16 meshing with the pinion 12, and the screw 22 on the shaft 20 are rotated, thereby pushing the control rod 24 in a direction marked with an arrow M. Meanwhile, the pinion 13 integral with the cap nut 14 is turned by the gear 16 in the same direction as that of the pinion 12, but at a rotational speed a little faster than that of the pinion 12, due to a small difference in the number of teeth of these two pinions. Consequently, the male screw 15 is gradually drawn out of the cap nut 14 which is kept at a position determined by the position of the signal rod 17, until the follower wheel 6 restores its neutral position.

Thus the gearing 12, 13 and 16 in conjunction with the thread engaged cap 14 and rod 15 constitute a differential gear mechanism which serves as a follow-up to restore the follower wheel 6 to its neutral position when motion of the signal rod 17 is stopped.

Figure 3A:
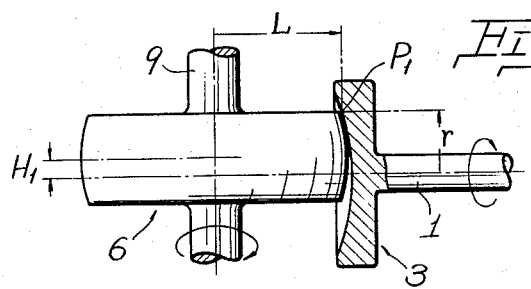
Figure 3a and Figure 3b are schematic views showing the mode of operation of the infinitely variable speed changing mean used in the apparatus shown in Figure 1 and Figure 2.
Figure 3B:
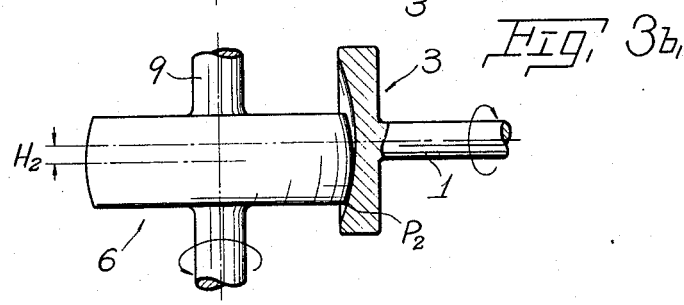

In case the follower wheel 6 is shifted downwardly by a distance $H_2$ from its neutral position by pushing the signal rod 17, the point of frictional engagement between the driving wheel and the follower wheel comes to a position $P_2$ shown in Figure 3b, and the direction of rotation of the follower wheel 6 is reversed, as compared with the case shown in Figure 3a. Consequently, the control rod 24 is pulled in a direction shown by an arrow N, until the follower wheel 6 is restored to the original position, i.e. the neutral position, and comes to rest.

The effective radius $r$ for the distance of the contact point from the axis of the driving wheel 3 is expressed as follows.

$$r = \frac{C}{C-c}H$$

where H is the amount of the axial displacement of the follower wheel 6, and C and c are the radii of curvature of the concave surface 4 and the convex surface 5. Thus, the effective radius $r$, as compared with the displacement H of the follower wheel 6, is magnified by a ratio $$\frac{C}{C-c}$$

and this permits greater power to be transmitted through the frictional engagement. The displacement D available to the control rod 24, when the signal rod 17 is shifted by an amount H is expressed by the following formula.

$$D = \frac{d_2}{d_1} \frac{H}{K-k}$$

Where $d_1 d_2$ denote the pitches of the screw 15 and the screw 22, and K and $k$ denote the gear ratios of the gear 16 to the pinion 13 and the pinion 12, respectively. Thus D/H may be set at a desired value by properly designing the values of $d_2/d_1$ and $1/(K-k)$.

It is also possible, of course, to use the rotation of the gear 16 directly for servo-control, without converting the rotation to translational motion by means of the nut and screw mechanism as mentioned. The rotational speed of the follower wheel created by a displacement of signal rod may be diminished as it tends to restore its neutral position by virtue of the suitable other differential mechanism.

As is apparent from the foregoing description made in conjunction with a preferred embodiment of the present invention, a reliable servo-control appliance of purely mechanical construction, as compared with the conventional servo-control apparatus utilizing hydraulic pressure, electric motor, etc., is obtained at a lower cost.

What I claim is:

1. A servo-control mechanism, comprising an infinitely variable speed changing means provided with a driving wheel with a concave engaging surface on one side thereof and a follower wheel with a convex engaging surface cooperative with said concave surface of the driving wheel, the follower wheel being pressed against the driving wheel resiliently and capable of being driven in both directions from a neutral position at a speed ranging from zero to a certain value, the neutral position being established by alignment of the center of the convex peripheral surface with the center of the concave surface, a signal means for furnishing the follower wheel with axial displacement from its neutral position to give rise to rotation thereof, and a compensating means including a differential gear mechanism for enabling the follower wheel to restore automatically its neutral position.

2. A servo-control mechanism, comprising an infinitely variable speed changing means provided with a driving wheel with a concave engaging surface on one side thereof and a follower wheel with a convex engaging surface cooperative with said concave surface of the driving wheel, the follower wheel being pressed against the driving wheel resiliently and capable of being driven in both directions from a neutral position at a speed ranging from zero to a certain value, the neutral position being established by alignment of the center of the convex peripheral surface with the center of the concave surface, a signal means for furnishing the follower wheel with axial displacement from its neutral position to give rise to rotation thereof, a pinion arranged to be turned at a speed slightly differing from the speed of the follower wheel, and a mechanism for converting the relative rotational motion between the pinion and the follower wheel to axial translational motion of the follower wheel to compensate an axial displacement given by the signal means to the follower wheel and to permit the follower wheel restoring its neutral position.

3. In a servo-control mechanism, the combination comprising an infinitely variable speed changing means having a driving wheel with a concave surface concentric with the axis thereof, a driving shaft for rotating said driving wheel continuously in one direction and a follower wheel provided with a convexly curved periphery frictionally engaged with the concave surface of said driving wheel, said follower wheel being mounted on a follower shaft for rotation about an axis normal to the axis of rotation of said driving wheel and also being slidable along its axis of rotation in either direction from a neutral position wherein the center of its convexly curved periphery is aligned with the center of said concave surface, a first pinion gear secured upon said follower shaft, an output gear meshed with and driven by said first pinion gear, a second pinion gear meshed with said output gear, said second pinion gear having a different number of teeth than said first gear and being formed as part of a nut threadedly engaged with said follower shaft, and means for effecting axial displacement of said follower shaft by application of an input signal force to said nut applied axially to the latter.

References Cited in the file of this patent

UNITED STATES PATENTS

| | | |
|---|---|---|
| 1,647,413 | McPherson | Nov. 1, 1927 |
| 2,263,371 | Tolnai | Nov. 18, 1941 |
| 2,392,889 | Tear | Jan. 15, 1946 |
| 2,540,989 | Newell | Feb. 6, 1951 |
| 2,828,638 | Rullo | Apr. 1, 1958 |